A. M. LANE.
MACHINE FOR FORMING METAL WEATHER STRIPS.
APPLICATION FILED APR. 21, 1910.

1,005,848.

Patented Oct. 17, 1911.
10 SHEETS—SHEET 1.

Witnesses:
Edgar T. Farmer
G. A. Pennington

Inventor.
Alfred M. Lane,
By ____, attys.

A. M. LANE.
MACHINE FOR FORMING METAL WEATHER STRIPS.
APPLICATION FILED APR. 21, 1910.

1,005,848.

Patented Oct. 17, 1911.
10 SHEETS—SHEET 2.

Witnesses:
Edgar T. Farmer
G. A. Pennington

Inventor:
A. M. Lane
attys.

A. M. LANE.
MACHINE FOR FORMING METAL WEATHER STRIPS.
APPLICATION FILED APR. 21, 1910.

1,005,848.

Patented Oct. 17, 1911.
10 SHEETS—SHEET 6.

Witnesses:
Edgar T. Farmer
G. A. Pennington

Inventor:
Alfred M. Lane,
By Arnst Davis, attys.

A. M. LANE.
MACHINE FOR FORMING METAL WEATHER STRIPS.
APPLICATION FILED APR. 21, 1910.

1,005,848.

Patented Oct. 17, 1911.
10 SHEETS—SHEET 7.

Witnesses:
Edgar T. Farmer
G. A. Pennington

Inventor:
Alfred M. Lane,
By Carver & Carver, attys.

A. M. LANE.
MACHINE FOR FORMING METAL WEATHER STRIPS.
APPLICATION FILED APR. 21, 1910.

1,005,848.

Patented Oct. 17, 1911.
10 SHEETS—SHEET 8.

Witnesses:
Edgar T. Farmer
G. A. Pennington

Inventor:
Alfred M. Lane,
By Crust & Crust, attys.

A. M. LANE.
MACHINE FOR FORMING METAL WEATHER STRIPS.
APPLICATION FILED APR. 21, 1910.

1,005,848.

Patented Oct. 17, 1911.
10 SHEETS—SHEET 10.

Witnesses:
Edgar T. Farmer
G. A. Pennington

Inventor:
Alfred M. Lane
By Cant & Carr
attys.

UNITED STATES PATENT OFFICE.

ALFRED M. LANE, OF ST. LOUIS, MISSOURI, ASSIGNOR TO MONARCH METAL WEATHER STRIP COMPANY, OF ST. LOUIS, MISSOURI, A CORPORATION OF MISSOURI.

MACHINE FOR FORMING METAL WEATHER-STRIPS.

1,005,848.　　　　　Specification of Letters Patent.　　Patented Oct. 17, 1911.

Application filed April 21, 1910. Serial No. 556,678.

*To all whom it may concern:*

Be it known that I, ALFRED M. LANE, a citizen of the United States, and a resident of the city of St. Louis and State of Missouri, have invented a certain new and useful Machine for Forming Metal Weather-Strips, of which the following is a specification.

This invention relates to machines for forming metal weather strips and the like, having ribs or beads thereon.

It has for its principal objects to minimize the cost of manufacture, to secure uniformity and accuracy of shape, and to attain certain other advantages hereinafter more fully appearing.

The invention consists in the parts and in the arrangements and combinations of parts hereinafter described and claimed.

In the accompanying drawings, which form part of this specification and wherein like symbols refer to like parts wherever they occur.

As shown in the drawings, the machine is mounted on a table or supporting frame 1. The forming or shaping machine proper comprises a base 2 and parallel side frames 3, 4, respectively. The respective side frames 3, 4 are provided with vertical slotted portions to provide column guides between which are fitted journal blocks or bearings 5 for the respective transverse shafts hereinafter referred to.

In the blocks or bearings 5 at the front of the machine are journaled upper and lower shafts 6, 7, respectively, on the right hand ends of which are fixed gears 8, 9 which mesh with each other. In the second sets of bearings 5 are journaled shafts 10, 11, on the ends of which are fixed gears 12, 13. In the third sets of bearings 5 are journaled shafts 14, 15 having gears 16, 17 fixed thereon. In the rearmost sets of blocks are journaled shafts 18, 19 having gears 20, 21 fixed thereon. A shaft 22 is journaled in the blocks 5 between the rearmost upper set of bearing blocks and the upper set which are located midway between the ends of the machine. On the end of this shaft 22 is fixed a gear 23. Intermediate gears 24, 25, 26, 27 are journaled on stub shafts or studs 28 projecting outwardly from the side frame 3; and these intermediate gears mesh with the several upper gears 8, 12, 16, 20, 23, whereby all of said uppermost gears are simultaneously rotated in a common direction. The lowermost gears 9, 13, 17, 21, being in mesh with their companion upper gears are also simultaneously rotated in a common reverse direction.

Any of the shafts may be employed as the driving shaft; but, preferably, the upper rearmost shaft 18 is the driving shaft.

On the left hand end of the upper shaft 6 is fixed a disk or roll 29 having an annular peripheral rib 30. On the lower shaft 7 a companion disk or roll 31 having an annular peripheral groove 32 which is a counterpart of the rib 30 on said roll 29, the groove, however, being of slightly larger dimensions than the rib; that is, a clearance is provided which is equal to or approximately the same as the thickness of the sheet of metal from which the weather strip is to be formed. On the end of the shaft 10 is fixed a disk or roll 33 having a peripheral rib 34; and on the end of the shaft 11 is fixed a disk or roll 35 having a peripheral groove 36 which coöperates with said rib 34 on the disk 33. The respective companion disks or rolls 29, 31 and 33, 35 are similar, the difference being that the rib 34 and coöperating groove 36 are deeper than the rib 30 and groove 32. So, too, there is a fillet provided on each side of the rib 30 and the edge portions of the groove 32 are rounded to correspond therewith, while the edge portions of the groove 36 and angles at the base of the rib 34 are sharp or substantially right angles.

On the left hand end of the shaft 14 is fixed a disk 37. This disk is provided with a substantially V-shape peripheral groove 38 with an annular rib 39 in the middle thereof. The periphery of the rib 39 is substantially flush or even with the periphery of the disk. Fixed on the end of the shaft 15 is a disk 40 whose opposite corners are beveled off or chamfered as at 41 to correspond with the bevel of the grooved portions 38 of the disk 37. This disk 40 is provided with an annular groove 42 which preferably has a square bottom as shown.

The operation of the machine as thus far described is as follows: A strip of sheet metal is fed lengthwise between the counterpart rolls or disks 29, 31, and is thereby grooved lengthwise; the bottom and edge portions of the groove being rounded owing to the form of the coöperating rolls. The strip is successively passed between the next pair of rolls 33, 35 and the groove in the strip is thereby made deeper and the edge portions thereof are formed into sharp angles. The strip next passes between the rolls 37, 40 whereby the portions of the strip on each side of the groove are bent downwardly at a sharp angle, preferably approximating forty-five degrees.

The body portion of the finished strip S¹ as shown in Figs. 23 to 26, inclusive, is flat and a bead S² having undercut sides is formed lengthwise thereof. To form the finished bead, the strip as it emerges from between the rolls 37, 40, is first passed over a grooved block 43 which is mounted beneath a lateral extension 44 on the lower end of a supporting bracket 45. The bracket is provided with a groove portion 46 which slidably fits a vertical rib 47 on the outer face of a lug 48 depending from a cap plate 4ª which is secured on top of the left hand side frame 4. The grooved portion 49 of the block 43 is of sufficient dimensions to permit the rib formed on the strip in the process of grooving the same, to pass freely therethrough, and the top portions of said block 43, on opposite sides of the groove 49 therein, are beveled and inclined downwardly from the rear to the front end thereof as at 50. Said beveled faces 50 on the block 43 also gradually increase to a sharper angle toward the front end thereof.

After the strip passes over the block 43, it is carried upon two companion horizontally-disposed disks 51 whose lower edge portions are undercut or rabbeted as at 52. The adjacent top edge portions of the two disks 51 nearly meet, while the portions immediately below the top edge and above the cut out portions 52 are slightly undercut as at 53, so as to be counterparts of the undercut side portions of the finished bead on the strip. By this arrangement, the opposite sides of the ribbed portion formed by grooving the strip are pinched close together at the base or body portion of the strip.

Journaled on a horizontal axle or shaft 54 which is disposed in the vertical plane of a transverse diametrical line through the two horizontal disks 51, is a roller 55 having a peripheral groove 56 therein which coöperates with the opposite undercut peripheral portions 53 of the disks 51 to constitute a complete counterpart of the finished bead on the strip. This roller 55 has its opposite edge portions rabbeted or grooved annularly, as at 57, so as to form a counterpart of the undercut or rabbeted portion 52 of the disks 51. This roller 55 at all times touches the annular shoulders formed by the undercuts 52 in the disks 51 and thereby supports and steadies the coöperating peripheral portions of the two disks 51 while the bead is being formed on the strip.

Mounted medially above the roll 55 and coöperating disks 51 is a roller 58. This roller 58 is fixed on the shaft 22 and its lowermost peripheral portion lies slightly above the top faces of the companion disks 51, the space being approximately equal to or a little less than the thickness of the sheet of metal from which the weather strip is being formed. On the shaft 22 are also secured two oppositely disposed miter gears 59, 60 which mesh with similar gears 61, 62 on the upper ends of the vertical shafts 51ª on which the disks 51 are fixed. By this arrangement, the disks 51 and roller 58 are rotated simultaneously. The coöperating roller 55 is an idler and receives its motion merely through the frictional contact with the strip and disks 51.

The action of the machine upon the strip after the same passes from the pair of rollers 37, 40 is as follows: After the strip emerges from between the rollers 37, 40, it passes between the flange portion 44 on the bracket 45 and the grooved beveled bracket 43 which is secured to the underside of said bracket. As the strip passes over the block 43, the inclined bevel portions 50 which are gradually decreased in angularity toward the rear of the block, tend to straighten the bent down side portions of the strip to a certain extent, and the strip is guided onto the two disks 51. As the strip progresses it is carried under the roller 58, whereby the downturned side portions are straightened out and flattened, and the ribbed portion is crowded into the space between the coöperating peripheral undercut portions 53 of the disk 51 and peripheral groove 56 in the roller 55. The strip is then formed into its final shape; that is, as far as the contour of the bead is concerned. The strip then passes over a guide bracket 63 having an undercut or dove-tail groove 64 in its upper side to accommodate the undercut bead on the strip. This guide bracket 63 is mounted so as to be adjusted laterally with respect to the alinement of the several sets of disks or forming rolls. The adjustment is preferably effected by slotting the bracket as at 65 and securing the same by inserting a screw through said slot into a threaded hole in a boss or lug 66 on the base of the machine.

Figure 15:
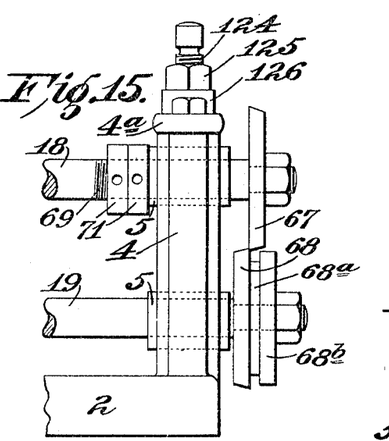
Fig. 15 is a fragmentary rear edge view of the rotary shears.
Figures 16, 17, 18, 19:
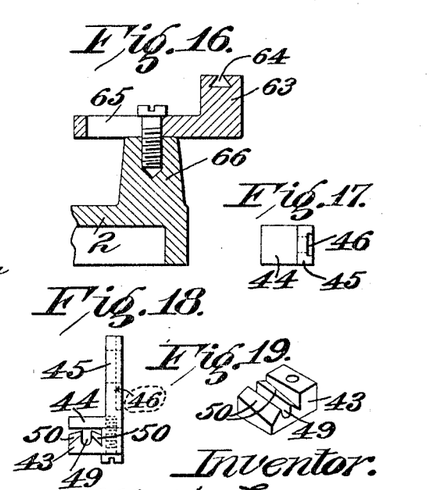
Fig. 16 is a section on the line 16—16 of Fig. 2.
Fig. 17 is a top view of the supporting bracket for the beveled guide block detached.
Fig. 18 is a front view of the supporting bracket with the beveled guide block in position thereon.
Fig. 19 is a detail perspective view of the beveled guide block detached.
Figure 20:
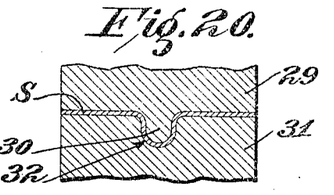
Figs. 20 to 24, inclusive, are fragmentary sections, on an enlarged scale, showing the successive shapes of the strip from the initial formation to and including the final operation of trimming the marginal portion of the base.
Figures 21, 22, 25:
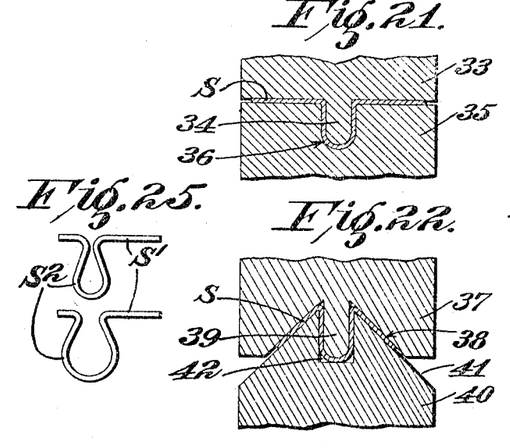
Fig. 25 is an end elevation of a bead and groove strip detached.
Figure 23:
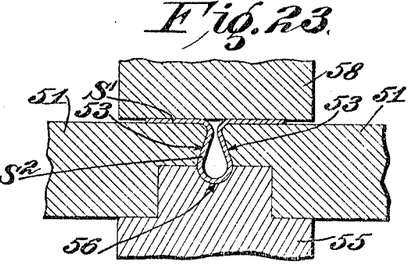
Figure 24:
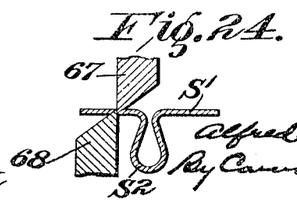
Figure 26:
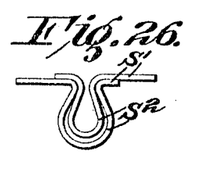
Fig. 26 is an end elevation showing the two strips fitted together as ordinarily used.

After the strip finally passes through the forming or shaping process, it is then passed between a pair of rotary disk-shears 67, 68, which are mounted on the shafts 18, 19, respectively. The two disks 67, 68 have coöperating beveled edge portions which overlap slightly; and, the shafts 18, 19 are arranged so that they may be adjusted relatively endwise to permit the coöperating disks 67, 68 to be adjusted to different positions in order to trim the desired portion of the weather strip which is being formed. This adjustment of the two shafts 18, 19, is preferably effected by screw-threading said shafts, as at 69, 70, respectively, and threading thereon thrust rings or nuts 71, 72. These thrust rings or nuts 71, 72 are arranged in pairs so as to act as jam nuts, whereby they are locked in their adjusted positions. As the thrust on the disk 67 is outward, the thrust rings 71 are located on the shaft 18 next to the bearing block on the right hand side frame 4, and the thrust on the disk 68 being inwardly, the thrust rings 72 on the shaft 19 are located next to the bearing block on the left hand side frame 3. The disk 68 is preferably made thicker than the disk 67, as shown more clearly in Fig. 15, and grooved annularly as at 68ª to receive the bead, while the base portion at the outer side of the bead is supported by the peripheral portion 68ᵇ.

The completed strip after being sheared is passed over a plate or bracket 73 having a groove 74 for the accommodation of the bead on the strip. The waste portion which is cut from the strip is guided under a guide-piece 75 until it is carried a sufficient distance from the machine to prevent it coiling back and interfering with the working parts of the machine. To further guide the strip after it leaves the shears, and in order to deflect it in any desired direction, a pair of oppositely-disposed disks 76 are mounted eccentrically on the top of the plate 73, so that the beaded portion of the strip is caused to pass between them as it leaves the machine. These disks 76 are provided with studs 77 which project downwardly through perforations in the plate 73 and have clamping nuts thereon. By adjusting the disks 76 to different positions with respect to the axial alinement of the several sets of forming disks, the completed strip may be either carried straight ahead or deflected to the right or left, as the case may be, as it leaves the machine.

The plate 73 is adjustably mounted on the upper end of an inclined bar or member 79 which is adjustably secured at its lower end to a lug or boss 80 projecting from the rear end of the base 2 of the machine. The bar is preferably pivoted on a screw 81 whereby it may be rocked so that its upper end is adjusted to different heights and secured in such position. The plate 73 is, preferably, likewise secured by a screw 82 to the upper end of the bar 79 to permit of its proper adjustment. The openings in the bar 79 through which the screws 81 and 82 are inserted are preferably elongated to further facilitate the adjustments.

As shown in Figs. 4 to 7, inclusive, the strips of metal from which the weather strips are formed are fed automatically into the machine. This automatic feeding of the strips is preferably accomplished by the construction illustrated. In this construction, the several blank strips S are supported in racks 83 which comprise parallel vertical members 84, 85 between which the strips are placed. Any suitable number of these racks may be provided, depending upon the length and flexibility of the blank strips. These racks are provided with split sleeve portions 86 having depending lugs 87 which are perforated to receive clamping bolts 88, whereby said racks may be adjusted lengthwise of a horizontal supporting rod 89 and securely fastened in their respective adjusted positions. This rod 89 is mounted at one end in a bracket 90 which projects laterally from the left hand side of the front end portion of the base 2 of the machine, while its opposite end is secured in a bracket 91 which is mounted on the table 1.

Mounted on top of the bracket 90 is an abutment member 92 having a forwardly projecting horizontal shelf 93 on which the inner end portions of the blank strips S are normally supported. This shelf or forward extension 93 on the abutment piece 92 is located so that its upper face lies substantially in the horizontal plane adjacent to the coöperating peripheral portions of the forming rolls 29, 31, so that the lowermost strip in a pile is in position to be shifted laterally in position to be fed directly between the rolls.

The racks 83 are each provided with a horizontally-disposed tubular portion 94 which extends transversely under the column guides or parallel vertical members 84, 85, and has a slot 95 which opens into the space between said vertical members or column guides. Mounted in this tubular portion is a reciprocatory member 96 which has a spring tongue 97 on its upper side. This spring tongue has a wedge-shaped or tapered end portion 98 which forms a shoulder or hook 99 at its inner end. A coil spring 100 is interposed between the end of the reciprocatory member 96 and the outer end of the tubular chamber 94, whereby said reciprocatory member is normally held in the opposite end portion of said chamber 94. The several rack members 83 are provided with inwardly extending ears or lugs 101 which are perforated in axial alinement to receive a shaft 102. One end of this shaft 102 is journaled in the bracket 91 and its opposite end is journaled in a sleeve or collar 103 which is fixed on a stub shaft 104 extending transversely with respect to the cross shaft 6. Said stub shaft is journaled in a bearing bracket 105 which is secured to the front end of the base 2 of the machine. On the rear end of the stub shaft is a worm gear 106 which meshes with a worm screw 107 on the cross shaft 6. By this arrangement, the stub shaft 104 rotates simultaneously with the rotation of the shaft 6. To connect the shaft 102 with the stub shaft 106 a coupling sleeve or collar 108 is feathered on said shaft 102 and provided with a clutch portion or pins 109 which fit in counterpart portions or notches 109ª in the collar 103. This clutch sleeve is preferably provided with a peripheral annular groove 109ᵇ and the peripheral edge portions are preferably knurled, as shown, to provide a convenient grasping portion whereby the sleeve may be readily manipulated.

Feathered on the shaft 102 are cam disks 110 which are located between the lugs or ears 101 on the rack members 83. The inner ends of the horizontal portions 94 of the rack members 83 are slotted as at 111 to make clearance for the high side of the cam disks 110. The outer end portions of the reciprocatory members 96 also project normally into these slotted portions 111 in coöperative relation to said cam disks.

The shaft 102 is grooved lengthwise as at 112 to receive the splines or keys of the cam disks; and the groove extends substantially the entire length of the shaft. By this arrangement, the racks 83 and coöperating cam disks may be readily adjusted to different positions on their rod 89 and shaft 102, respectively. The splines for the clutch collar 103 also work in said groove 112.

Figure 1:
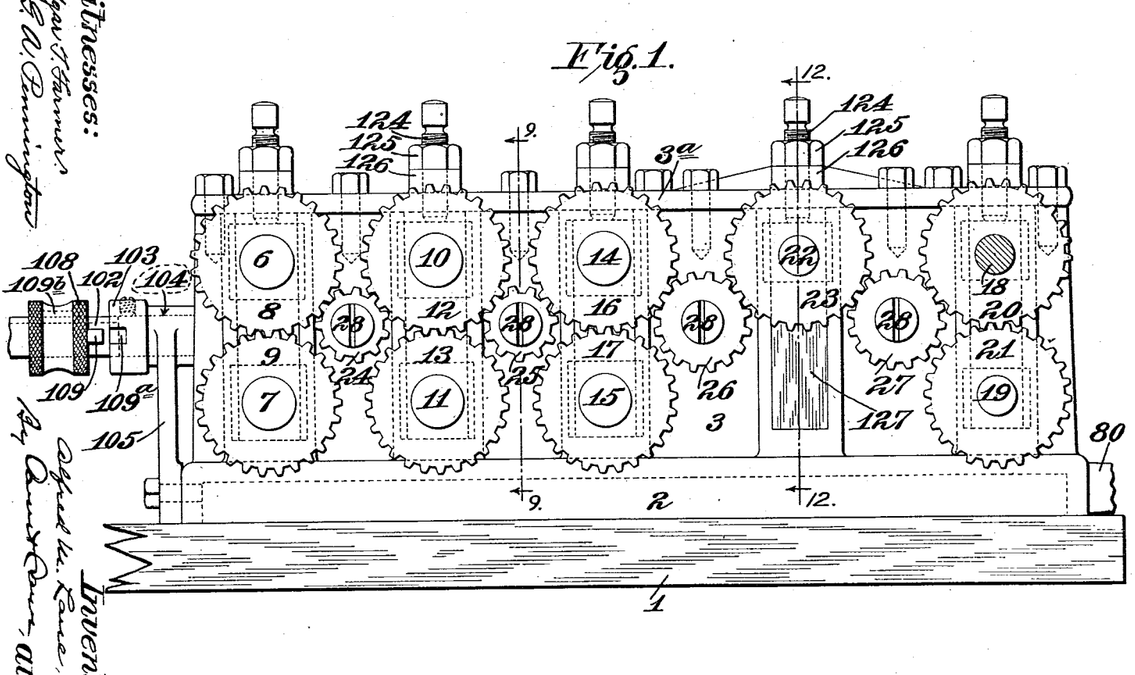
Figure 1 is a side elevation of the right hand side of a machine embodying my invention.
Figure 2:
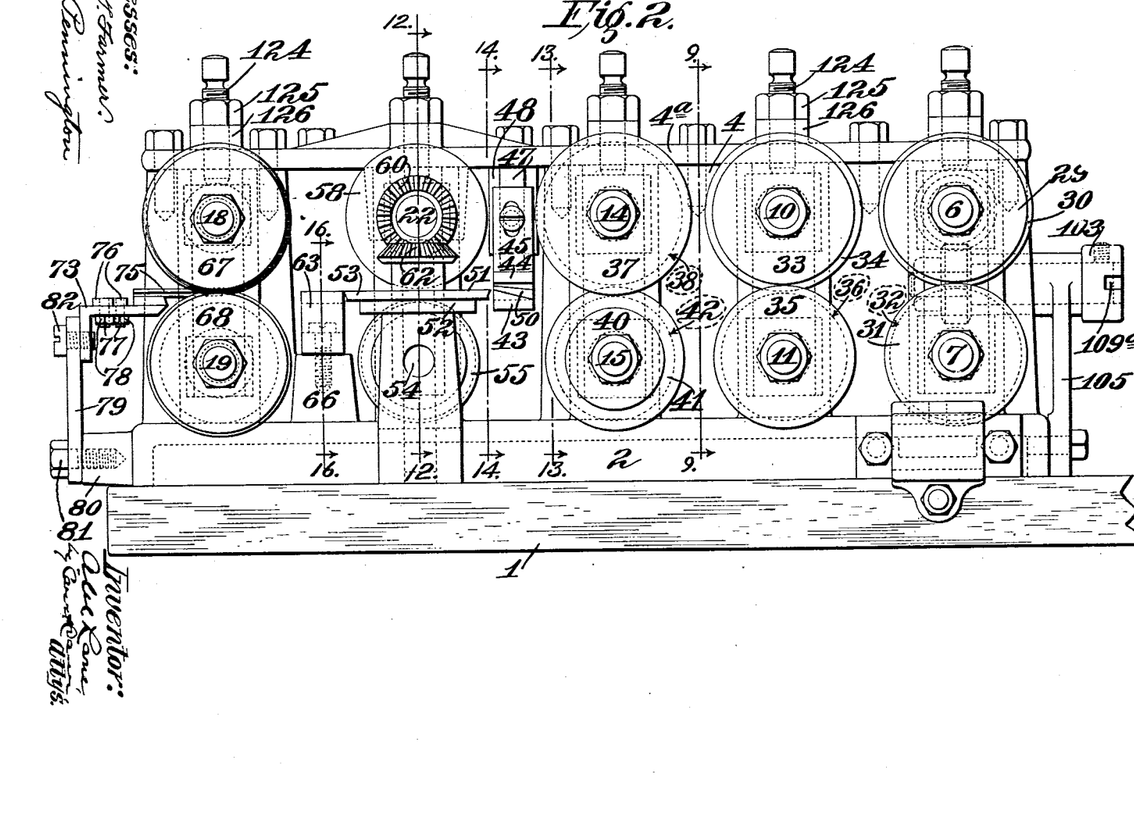
Fig. 2 is a side elevation of the left hand side of the machine.
Figure 3:
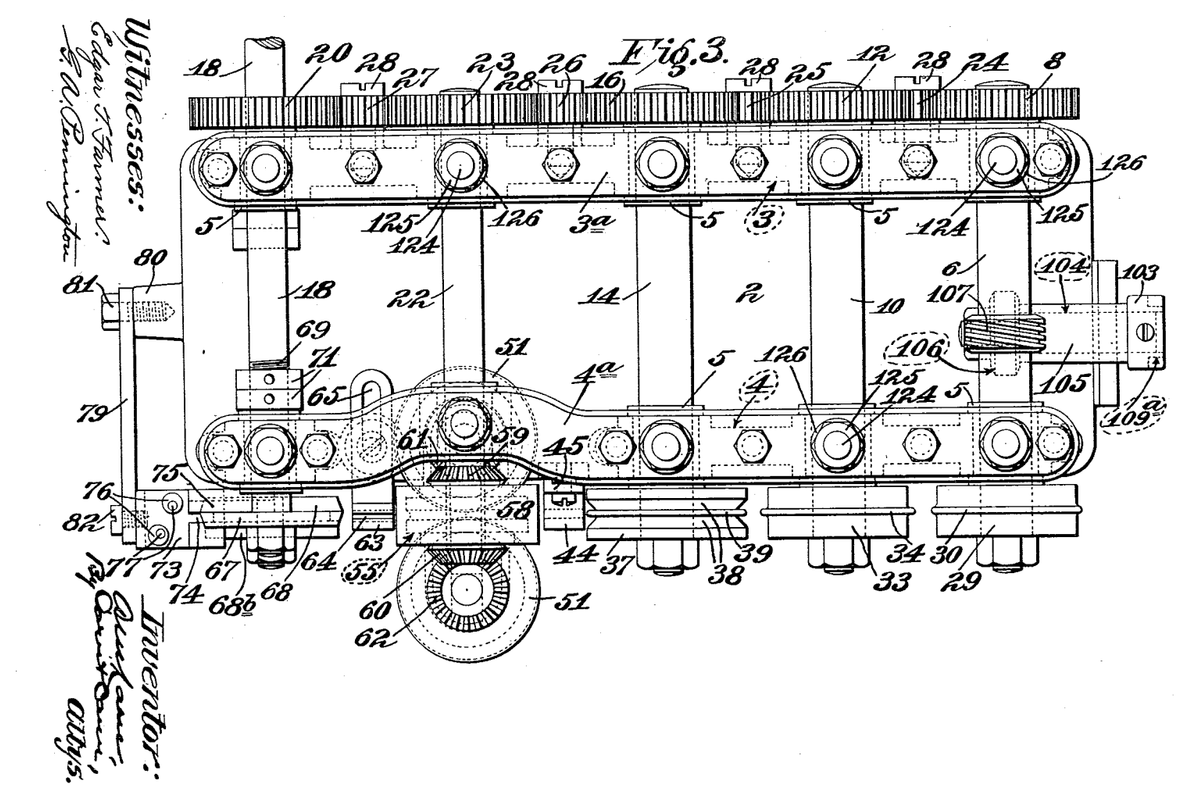
Fig. 3 is a top plan view.
Figure 4:
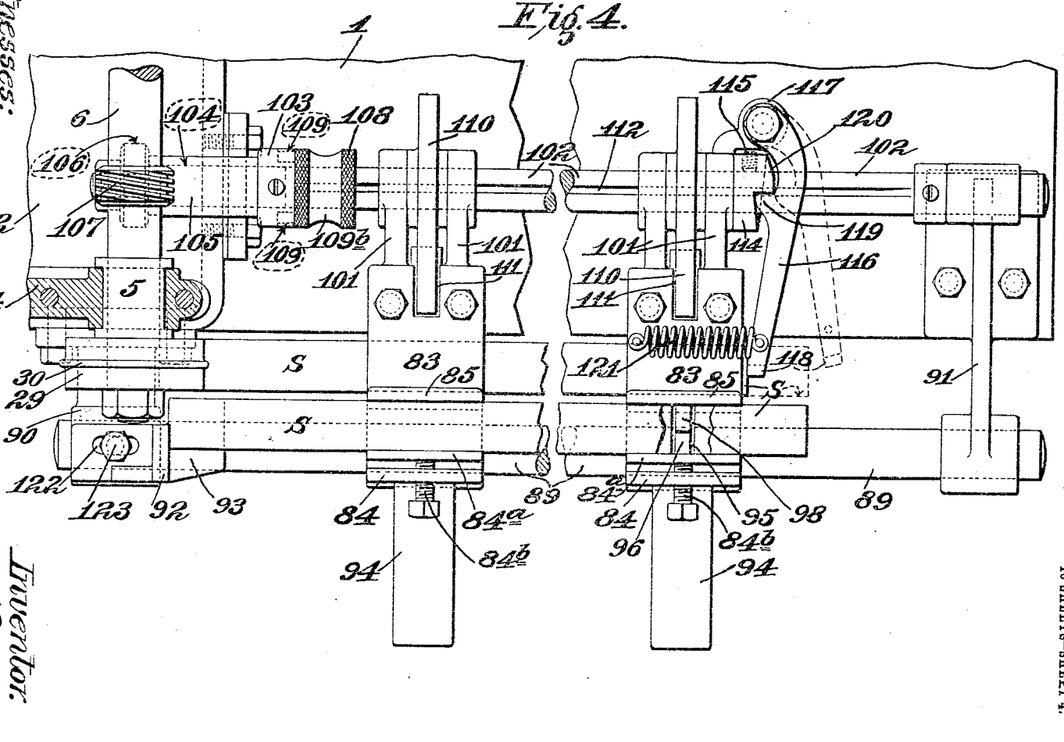
Fig. 4 is a top plan view of the strip-feeding mechanism.
Figure 5:
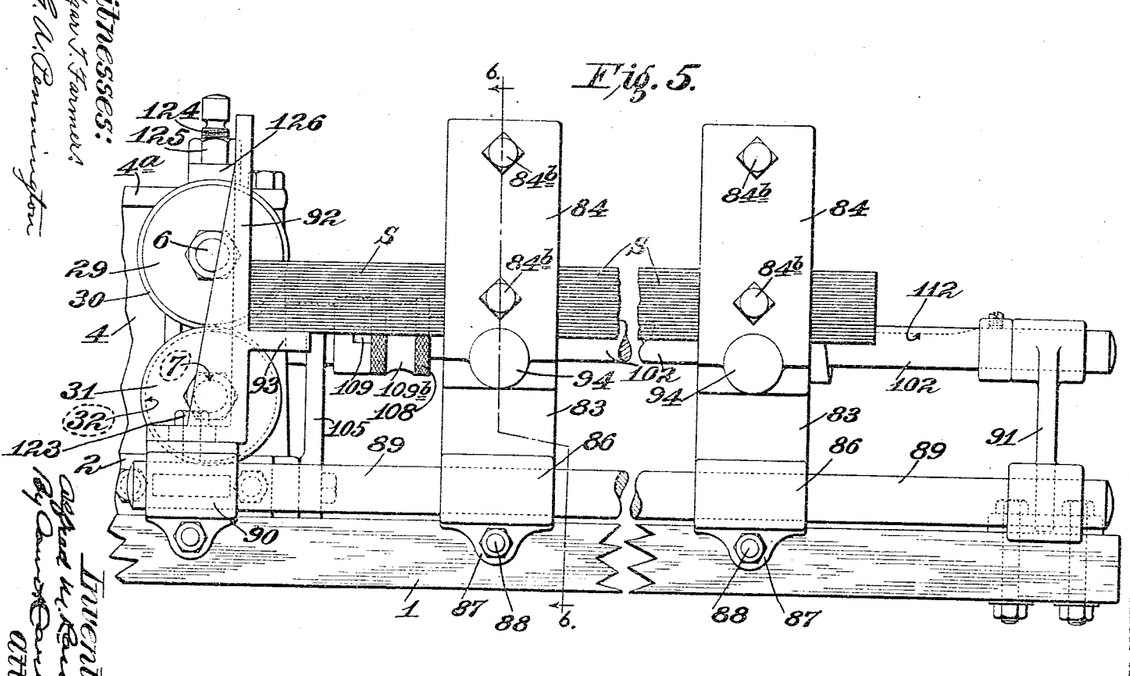
Fig. 5 is a side elevation of the strip-feeding mechanism.
Figures 6, 8:
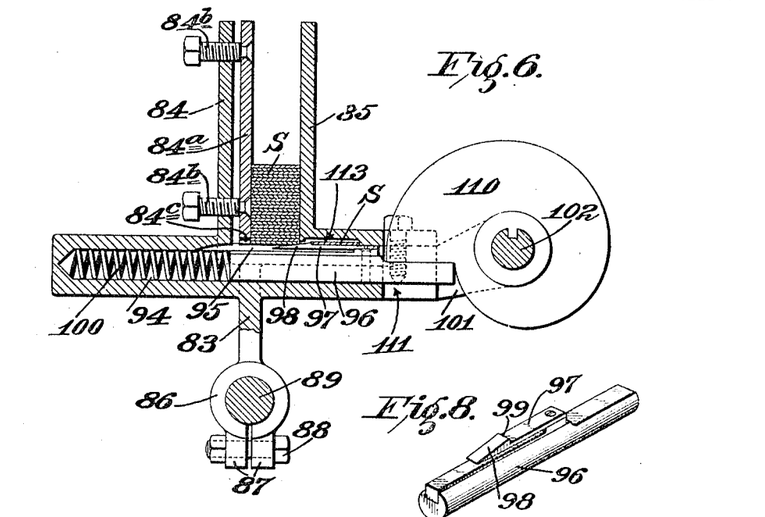
Fig. 6 is a transverse vertical section on the line 6—6 of Fig. 5.
Fig. 8 is a detail perspective view of one of the reciprocatory shifting members of the strip-feeding mechanism.
Figure 7:
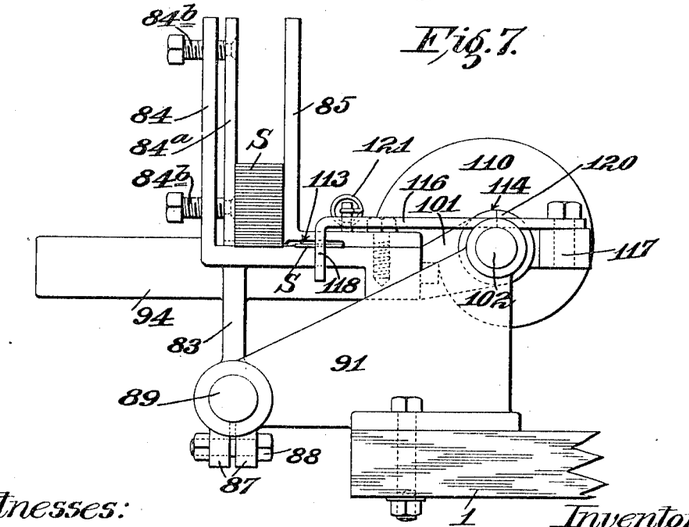
Fig. 7 is a front end elevation of the strip-feeding mechanism.

When the shaft 102 is rotated, the disks 110 being keyed or feathered thereon, rotate therewith, and said cams coöperating with the reciprocatory members 96, move said members inwardly against the tension of the springs 94. The high side of the cam is of sufficient dimensions to move the member 96 inwardly until the hooked portion or shoulder 99 thereon passes under and beyond the pile of blank strips S between the column guides 84, 85. As soon as the high portion of the cam passes from behind the member 96, the spring 100 will snap said member 96 back to normal position, as shown in Fig. 6 of the drawings. During this return stroke of the member 96, the hook portion or shoulder 99 on the spring tongue 97 engages the lowermost strip of the pile and carries the same laterally into a transverse slot 113. These slotted portions 113 in the racks 83 are arranged in line with the several forming rolls or disks of the machine. The openings between said slots 113 and the space in which the pile of blank strips is mounted are of a width a little greater than the thickness of a strip and less than the thickness of two of said strips, so that only one strip may be carried therethrough at a time. The balance of the slotted portion 113 is of somewhat larger dimensions than the width and thickness of the strip, so that the strip fits loosely therein.

In order to feed the strips to the machine, a cam collar or sleeve 114 is secured by a set screw 115 to the shaft 102, whereby said cam sleeve or collar may be adjusted and secured in different positions lengthwise of the shaft as well as different positions circumferentially thereof. This cam sleeve is mounted close to the outermost rack member 83 and coöperates with a lever-arm 116 which is pivotally mounted at one end to a lug 117 on one of the ears 101 of said endmost rack member 83. The opposite end of said lever-arm 116 is turned downwardly as at 118 and overlaps the slotted portion 113 in said endmost rack member 83. Said lever arm 116 is provided with a lug or projection 119 which coöperates with the cam faces 120 on said cam sleeve 114. The cam sleeve or collar 114 is, preferably, so located and timed with respect to the projection 119 that said lever-arm is held with its free end a short distance ahead of the end of the pile of strips just prior to the time that the bottommost strip is shifted from under the pile, as shown in dotted lines in Fig. 4. As soon as the strip has been moved over into line with the forming disks 29, 31, the highest point of the cam face 120 passes free of the projection 119 on the lever-arm and a spring 121 quickly retracts said lever-arm and brings the downward extension 118 thereon forcibly in contact with the end of the strip which has been shifted into position, and said strip is thereby fed between the two rolls 29, 31. As soon as the two rolls take hold of the strip, the strip is fed by the frictional contact therewith to the next set of rolls and so on through the machine.

The abutment member 92 may be adjusted to different positions longitudinally of its support if desirable, and, to permit of this adjustment, the same is preferably slotted as at 122 and secured by a screw 123. So, too, the bracket member may be adjusted vertically, as by placing shims or liners between the bottom of the abutment member 92 and top of the bracket 90 on which it is mounted, or by any other obvious means.

To accommodate strips of different width, a supplemental plate 84ª is adjustably mounted adjacent to the inner face of the upright 84 of the rack 83. This plate 84ª may be supported and adjusted in any desirable manner, but, preferably, it is swiveled to a pair of adjusting screws 84ᵇ which are inserted through threaded openings in said upright 84 as shown more clearly in Figs. 6 and 7. By moving the screws in and out, the space between the plate 84ª and opposite upright 85 may be varied to correspond to the width of the strips. In the bottom edge of the plate 84ª is a notch or groove 84ᶜ through which the hook portion or shoulder 99 on the spring tongue 97 passes and whereby said shoulder or hook is permitted to engage the lowermost strip of the pile.

Figure 9:
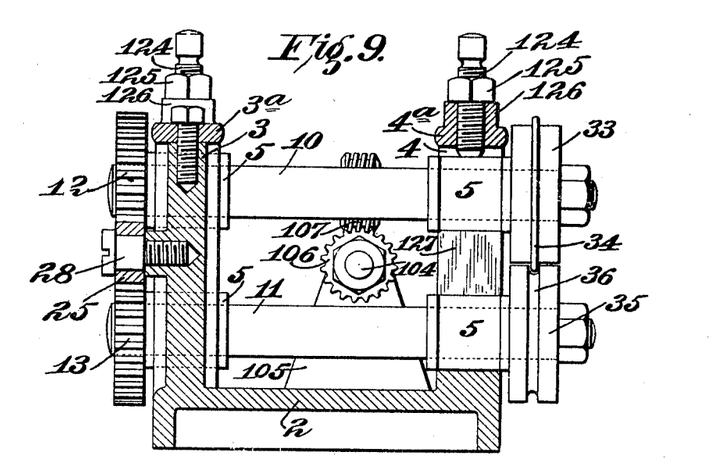
Fig. 9 is a section on the line 9—9 of Figs. 1 and 2.
Figure 10:
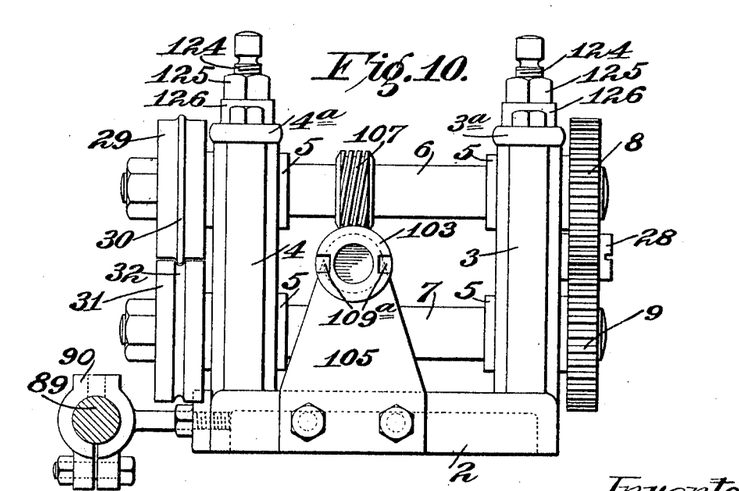
Fig. 10 is a front end elevation of the forming machine proper.
Figure 11:
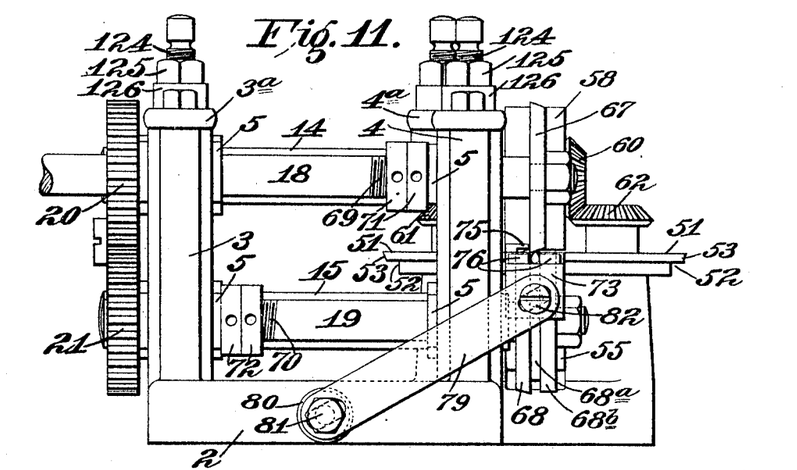
Fig. 11 is a rear end elevation of the machine.
Figure 12:
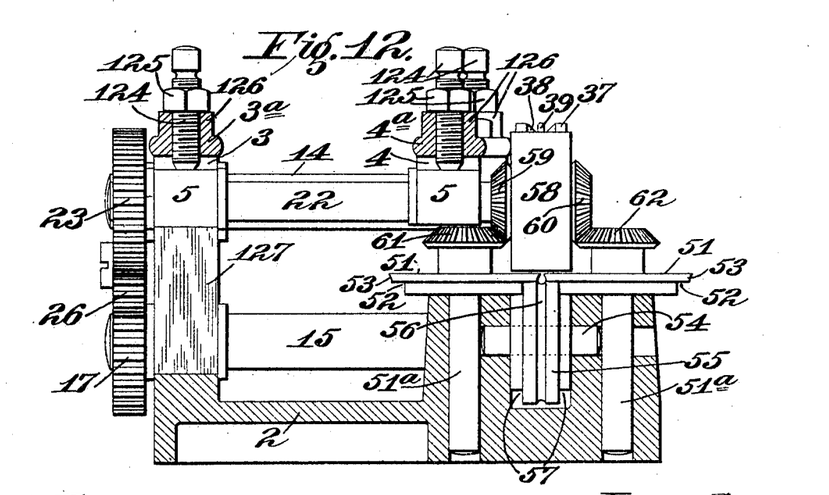
Fig. 12 is a section on the line 12—12 of Figs. 1 and 2.
Figure 13:
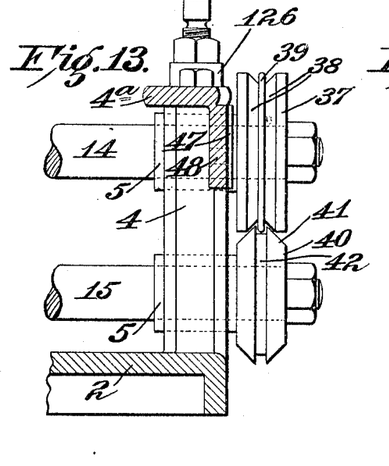
Fig. 13 is a section on the line 13—13 of Fig. 2.
Figure 14:
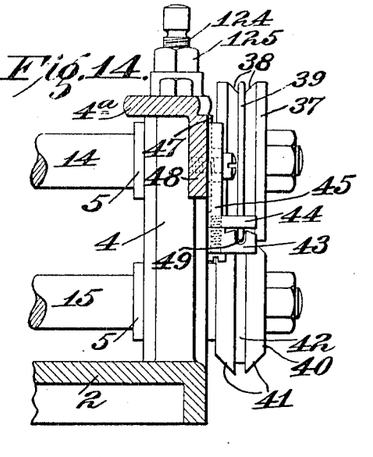
Fig. 14 is a section on the line 14—14 of Fig. 2.

Cap pieces 3ª, 4ª are secured on top of the respective side frames 3, 4, and adjusting screws or abutments 124 are inserted through vertical threaded holes therein so that their inner ends bear upon the upper bearing blocks 5 to limit the uppermost positions of said bearing blocks. By adjusting the screws 124 up and down the spaces between the several forming rolls may be varied to suit strips of different thicknesses. Jam nuts 125 are provided on the screws 124 so as to impinge against the top of the cap piece or bosses 126 formed thereon. Intermediate spacing blocks 127, preferably of hard wood, may be placed under the upper bearing blocks 5, as shown in Figs. 9 and 12, if desired.

By the construction of a machine as herein set forth, weather strips or similar articles having undercut beads or ribs can be automatically formed and the same will be completed with exact uniformity and nicety. In weather strips of the character illustrated, two counterpart strips are used, one being called an inner or bead strip and the other an outer or groove strip, the only difference being in the dimensions of the two beads which slidably fit one within the other. Therefore, one machine may be employed to roll the two strips, if desirable, it being only necessary to provide substitute forming rolls and disks of different dimensions. Also, if desired, the same machine may be employed to roll strips or ribs of various dimensions by merely changing the several forming rolls and disks. By the arrangement of the coöperating rolls 55, 58, and the disks 51, and feeding the strip thereto in the form in which it emerges from the rolls 37, 40, that is, with the substantially U-shape rib and downturned side portions, the action of the roll 58 in pressing said downturned side portions flat upon the top faces of the disks 51, crowds the ribbed portion into the space between the coöperating peripheral portions 53 of said disks 51 and the peripheral groove 56 in the roll 55 and thereby gives to said rib or bead its finished shape. That is, the outer portion of said bead is rounded while the sides adjacent to the base portion are pressed inwardly so that the opposite sides of the bead have an undercut effect. This construction and arrangement of the forming elements makes it unnecessary to use a mandrel. Consequently, the friction is minimized and the strip is passed through the machine without being unduly heated and without necessitating the use of a lubricant or cooling agent.

It is noted that the ratio of the worm gearing, or any other suitable transmission gearing which may be provided between the driving mechanism for the forming rolls and the shaft which operates the strip-feeding mechanism is, obviously, such that the strip which is being formed is passed beyond the initial pair of forming rolls before the next succeeding strip is fed to the forming rolls.

Obviously, the device admits of considerable modification without departing from my invention, and, therefore, I do not wish to be limited to the specific construction and arrangement shown.

What I claim is:

1. A machine for forming a longitudinal undercut bead on a sheet meal strip comprising, in combination, cylindrical forming rolls arranged in coöperating pairs, one roll of a pair having a peripheral groove in its middle and the companion roll having a counterpart peripheral rib working in said groove, whereby a strip passed between said roll is formed with a longitudinal grooved rib, and a pair of coöperating rolls journaled at right angles to said first mentioned forming rolls, the peripheral portions of said last mentioned rolls being formed to correspond with the final contour of the rib on the strip and adapted to press the sides of said rib inwardly and draw the base portions of the strip together.

2. A machine for forming undercut beads on strips of sheet metal comprising, in combination, a pair of counterpart rolls between which the strip is initially passed, one of said rolls having a peripheral annular rib and the other roll having a peripheral annular groove which coöperates with said rib, a second pair of rolls similar to said first mentioned pair, but having a relatively deeper correlated rib and groove, a third pair of rolls comprising, respectively, a roll having an annular peripheral groove whose side walls are beveled and an annular rib extending around the middle of said groove, and the other roll having chamfered edge portions which correspond to the bevel of the groove in the companion roll and said chamfered roll having a peripheral groove extending around the middle thereof and coöperating with the rib on the companion roll, a pair of horizontally-disposed disks whose adjacent peripheral portions are undercut, a roll mounted beneath said pair of horizontal disks in coöperative relation to the meeting peripheral portions thereof, said roll having a peripheral annular groove which coöperates with the undercut peripheral portions of said horizontal disks to constitute a pattern of the bead to be formed on the strip, and a roll mounted above said horizontal disks, both of said rolls being rotated about axes in the vertical plane of a transverse diametrical line through said horizontal disks, the several pairs and sets of forming rolls and disks being arranged in alinement, so that the strip may be passed successively between the same.

3. A machine for forming undercut beads on sheet metal strips comprising, in combination, a pair of counterpart initial forming rolls having, respectively, a peripheral annular rib and a peripheral annular coöperating groove, one or more successive pairs of counterpart forming rolls similar to said initial forming rolls, but having relatively deeper ribs and grooves, whereby the strip passed between said rolls is successively formed with a grooved rib of increasing depth, a pair of counterpart rolls arranged and adapted to turn the body portion of the strip at an acute angle on each side of the rib formed thereon, and a final forming device comprising a pair of horizontally disposed disks whose adjacent peripheral portions are undercut, a roll mounted beneath said horizontal pair of disks in coöperative relation to the peripheral portions thereof and having a peripheral annular groove adapted to coöperate with the undercut peripheral portions of said horizontal disks to constitute a form for the bead to be completed, and a roll mounted above said horizontal disks with its lowermost peripheral portion adjacent to the upper faces thereof, both of said rolls being rotatable about axes in the vertical plane of a transverse diametrical line through said horizontal disks, whereby the base portions of the strip are flattened and the ribbed portion is crowded into the form provided by the coöperating peripheral portions of said horizontal disks and the roll thereunder, so that the strip emerges therefrom with a undercut bead formed thereon.

4. A machine for forming beads on sheet metal strips comprising, in combination, a pair of counterpart initial forming rolls, said rolls having, respectively, an annular peripheral rib and an annular peripheral groove, one or more successive pairs of rolls similar to said initial pair, but having relatively deeper ribs and grooves, whereby a strip fed between said rolls is successively formed with a grooved rib of increasing depth, a pair of counterpart rolls arranged and adapted to turn the base portion of said strip at an acute angle on opposite sides of the rib formed thereon, and devices for completing the bead on said strip, the same comprising a pair of horizontally disposed disks whose adjacent peripheral portions are undercut, a roll mounted beneath said disks in coöperative relation to the peripheral portions of said disks and having an annular peripheral groove therein adapted to coöperate with the undercut peripheral portions of said disks to constitute a form for the bead to be completed, and a roll mounted above said horizontal disks with its lowermost peripheral portion adjacent to the upper faces thereof, both of said rolls being rotatable about axes in the vertical plane of a transverse diametrical line through said horizontal disks, whereby the angularly bent sides of the base portion of the strip are straightened out and the rib portion thereon is crowded into the form provided by the peripheral portions of said horizontal disks and the roll thereunder, so that the strip emerges therefrom with the completed undercut bead formed thereon, and means for simultaneously actuating all of said forming rolls and disks.

5. A machine for forming undercut beads on flat sheet metal strips comprising, in combination, a series of pairs of cylindrical forming rolls between which a strip is passed, one roll of each pair having a peripheral groove in its middle and the companion roll having a counterpart peripheral rib working in said groove and the groove and rib of each successive pair being deeper than those of the preceding pair so as to form a substantially U-shaped grooved rib on the strip which successively increases in depth as it progresses, and means located adjacent to the last pair of forming rolls and adapted to press the opposite sides of the U-shape rib inwardly and draw the base portions of the strip together, so that the rib is formed into an undercut bead.

6. A machine for forming undercut beads on sheet metal strips comprising, in combination, a series of successive pairs of similar counterpart forming rolls adapted to form a grooved rib of successively increasing depth on a strip which is fed between them, one roll of each pair having a peripheral groove and the companion roll having a peripheral rib working in said groove and the groove and rib of the successive pairs of rolls being deeper than those of the preceding pair, a set of coöperating rolls and disks adjacent to the last pair of ribbing rolls and adapted to press the sides of said rib inwardly near the base portion of the strip so as to form said rib into an undercut bead, and a pair of rotatory shears arranged adjacent to the final forming rolls and adapted to trim the marginal portion of the completed strip parallel with said bead.

7. A machine for forming longitudinal beads or ribs on sheet metal strips comprising, in combination, a series of counterpart forming rolls between which the strip is passed longitudinally, means for automatically feeding the blank strips to said rolls, said means comprising a support for a pile of blank strips which are normally out of alinement but parallel with said forming rolls, transversely-arranged, intermittently-actuating reciprocatory devices adapted to engage the lowermost strip of the pile and shift the same sidewise into alinement with said forming rolls, and means for moving the alined strip longitudinally into contact with the initial forming rolls of said series.

8. A machine for forming beads or ribs on sheet metal strips comprising, in combination, a series of counterpart forming rolls between which the strip is passed, means for automatically feeding the blank strips to said forming rolls, said means comprising a support arranged parallel with said forming rolls, transversely-arranged, intermittently-actuating devices adapted to engage the lowermost strip of the pile and shift the same into alinement with said forming rolls, and an intermittently-actuating tappet arranged and adapted to strike the outer end of said alined strip and move the same into contact with the initial forming rolls.

9. A machine for forming beads or ribs on sheet metal strips comprising, in combination, a series of counterpart forming rolls between which the strip is passed, means for automatically feeding the blank strips to said forming rolls, said means comprising a support arranged parallel with said forming rolls, transversely-arranged, intermittently-actuating devices adapted to engage the lowermost strip of the pile and shift the same into alinement with said forming rolls, an intermittently-actuating tappet arranged and adapted to strike the outer end of said alined strip and move the same into contact with the initial forming rolls, said forming rolls and the actuating means for said feeding mechanism being simultaneously actuated.

10. A machine for forming longitudinal beads or ribs on sheet metal strips comprising, in combination, a series of counterpart forming rolls between which the strip is passed longitudinally, said rolls being arranged in coöperating pairs or sets, and geared to be actuated simultaneously, means for automatically feeding the blank strips longitudinally to said forming rolls, said means comprising a support upon which the strips are piled normally out of alinement with but in parallel relation to said series of forming rolls, transversely-arranged, intermittently-actuating devices adapted to engage the lowermost strip of the pile and shift the same sidewise into alinement with said forming rolls, an intermittently-actuating device arranged and adapted to move the alined strip longitudinally into engagement with the pair of initial forming rolls, and a releasable clutch for coupling the actuating means for said strip-feeding device with the actuating means for said forming rolls, whereby said forming rolls and said strip-feeding device are simultaneously actuated.

11. In a machine for forming longitudinal beads or ribs on sheet metal strips, the combination with the forming mechanism, of means for automatically feeding the blank strips longitudinally to the forming mechanism, said means comprising a rack arranged to support a pile of strips normally out of alinement but parallel with the vertical plane of the feeding position of a strip with respect to said forming mechanism, transversely disposed spring-pressed reciprocatory members mounted below the pile of strips and having a spring catch thereon which is adapted to engage the lowermost strip in the pile when said members are moved in the direction to take said strip to feeding position, means for intermittently actuating said transverse reciprocatory members, whereby the lowermost strip in the pile is shifted sidewise therefrom into position to be fed to the forming mechanism, and an intermittently-actuating device arranged and adapted to move the positioned strip into engagement with the forming mechanism.

12. In a machine for forming beads or ribs on sheet metal strips, the combination with the initial forming rolls, of means for automatically feeding the blank strips longitudinally to said initial forming rolls, said means comprising rack members which are arranged in alinement so as to support a pile of blank strips in parallel relation to the vertical plane of the feeding position of a strip with respect to said rolls, each of said rac members being provided with transverse chambers beneath the bottom of the pile of strips thereon, a reciprocatory member in each of said chambers arranged and adapted to engage the lowermost strip of the pile and shift the same sidewise into feeding position, a shaft extending parallel with respect to the side of the pile of blank strips, cams mounted on said shaft and arranged and adapted to intermittently move the respective reciprocatory members into position to engage the strip at the bottom of the pile, a spring arranged to move each of said members back to normal position as said cams recede, whereby the strip is moved into feeding position, and an intermittently-actuating device arranged and adapted to engage the positioned strip and move the same longitudinally into contact with the initial forming rolls.

13. A machine for forming beads on sheet metal strips comprising, in combination, a series of pairs of counterpart forming rolls adapted to form a grooved rib lengthwise of a strip which is passed between them, one roll of each pair having a peripheral groove and the companion roll having a peripheral rib working in said groove, a set of coöperating rolls arranged and adapted to give to the rib the final form of the bead, and means for trimming the marginal portion of the completed strip parallel with the bead after it has emerged from the final forming rolls.

14. A machine for forming beads on sheet metal strips comprising, in combination, a series of pairs of counterpart forming rolls adapted to form a grooved rib lengthwise of a strip which is passed between them, a set of coöperating rolls arranged and adapted to give to the rib the final form of the bead, means for trimming the marginal portion of the finished strip parallel with the bead, and means for guiding the finished strip as it emerges from the machine.

15. A machine for forming longitudinal beads on sheet metal strips comprising, in combination, a series of pairs of counterpart forming rolls adapted to form a grooved rib lengthwise of a strip which is passed between them, a set of coöperating rolls arranged and adapted to give to the rib the final form of the bead, means for trimming the marginal portion of the finished strip parallel with the bead as it emerges from the final forming rolls, and an adjustable guide arranged to receive and guide the finished strip as it emerges from the machine.

16. A machine for forming longitudinal beads on sheet metal strips comprising, in combination, a series of pairs of counterpart forming rolls adapted to form a grooved rib lengthwise of a strip which is passed between them, a set of coöperating rolls arranged and adapted to give to the rib the final form of the strip, means for trimming the marginal portion of the strip parallel with the bead as it emerges from the final forming rolls, and an adjustable guide arranged to receive and guide the finished strip as it emerges from the machine, said guide comprising a supporting plate having a grooved guideway at its inner end for the bead and a pair of oppositely disposed disks mounted on said plate and having eccentric depending studs which are inserted through perforations in said plate and screw-threaded, and tightening nuts on the screw-threaded portions of said studs under said plate.

17. A machine for forming undercut beads on sheet metal strips comprising, in combination, a series of alined pairs of forming rolls, the rolls of each pair being provided with counterpart peripheral annular ribs and grooves, respectively, the ribs and grooves of the respective pairs being of different depths, whereby a strip passed between said rolls is formed with a grooved rib of increasing depth, a set of coöperating rolls arranged and adapted to press the sides of said rib inwardly near the base of the strip to form said rib into an undercut bead, a guide adjustably mounted between the initial series of forming rolls and said set of final forming rolls, a pair of rotary shears arranged to trim the marginal portion of the strip parallel with the bead formed thereon after it has emerged from the final forming rolls, a guide adjustably mounted between said shears and said set of final forming rolls, and an adjustably mounted guide arranged and adapted to receive and guide the finished strip as it emerges from the machine.

Signed at St. Louis, Mo., this 16th day of April, 1910.

ALFRED M. LANE.

Witnesses:
G. A. PENNINGTON,
J. B. MEGOWN.